United States Patent [19]

Mumper

[11] 4,129,850

[45] Dec. 12, 1978

[54] BALANCED TRANSDUCER

[75] Inventor: James E. Mumper, Newport, R.I.

[73] Assignee: Raytheon Company, Lexington, Mass.

[21] Appl. No.: 546,361

[22] Filed: Feb. 3, 1975

Related U.S. Application Data

[63] Continuation of Ser. No. 415,056, Nov. 12, 1973, abandoned.

[51] Int. Cl.[2] .................... H04B 13/00

[52] U.S. Cl. .................... 340/10; 340/8 PC; 340/8 MM

[58] Field of Search .................... 340/8-14; 310/8.7, 9.1

[56] References Cited

U.S. PATENT DOCUMENTS

| | | | |
|---|---|---|---|
| 3,284,761 | 10/1966 | Douglas | 340/10 |
| 3,550,071 | 12/1970 | Schlemm et al. | 340/10 |
| 3,593,257 | 6/1968 | Massa, Jr. | 340/14 |
| 3,665,381 | 5/1972 | Bauer | 340/11 |

*Primary Examiner*—Harold J. Tudor
*Attorney, Agent, or Firm*—David M. Warren; Milton D. Bartlett; Joseph D. Pannone

[57] ABSTRACT

A balanced sonar transducer comprising a front radiating mass and a rear mass coupled thereto via a ceramic transducer element which imparts vibrational motion to the front and the rear masses. The front and the rear masses are secured to a bulkhead via a tie rod which passes through the rear mass and the transducer element and is secured in the front mass. A disc spring is placed between the bulkhead and the rear mass and has a compliance of a suitable magnitude to resonate with the rear mass at a frequency which approximates the resonant frequency of the front mass with the compliance of the tie rod. The approximate matching of the resonant frequencies provides for a balancing of the stresses applied to the transducer element which insulates the transducer element from a vibrational acceleration imparted to the transducer assembly by vibrations of the ship and of the bulkhead to which the transducer assembly is affixed.

4 Claims, 4 Drawing Figures

BALANCED TRANSDUCER

CROSS REFERENCE TO RELATED APPLICATIONS

This is a continuation of application Ser. No. 415,056, filed Nov. 12, 1973.

BACKGROUND OF THE INVENTION

Transducers assemblies for sonar applications have been built with various configurations to provide compensation for the effect of hydrostatic pressure and to prevent the buildup of tensile stresses in a transducer element contained within the assembly. However, a problem arises in that transducer assemblies are frequently mounted on a vibrating surface, such as the hull of a ship which is caused to vibrate by the ship's engine, the screws, and the impact of waves against the ship. Such vibrations may be coupled to the transducer element and induce vibrational stresses within the transducer element, such stresses resulting in a modification of sonic energy transmitted by and received by the transducer assembly, thereby degrading the quality of signals communicated by this sonic energy.

SUMMARY OF THE INVENTION

The aforementioned problem is overcome and other advantages are provided by a transducer assembly having a structure which compensates for externally induced vibrations to permit the radiation and reception of sonic energy signals substantially independently of any influence by vibrations of a support structure to which the transducer assembly is mounted. In accordance with the invention, there is provided a transducer assembly comprising a transducer element positioned between a front mass and a rear mass, a compliant tie rod which urges the front mass and the rear mass against the transducer element for compressing the transducer element and for securing it to a base which supports the transducers assembly, and a compliant spring positioned between the rear mass and the base for urging the rear mass towards the transducer element and away from the base. The compliance of the spring is selected in accordance with the magnitude of the front mass and the rear mass and the compliance of the tie rod so that the frequency of resonance of the rear mass with the compliance of the spring approximates the frequency of resonance of the front mass with the compliance of the tie rod. This balancing of the resonant frequencies prevents the buildup of vibrational stresses in the transducer element arising because of vibrations in the base supporting the transducer assembly. The relationship between the compliances and the magnitudes of the masses may also be expressed as the ratio of the rod compliance to the spring compliance which is approximately equal to the ratio of the rear mass to the front mass.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
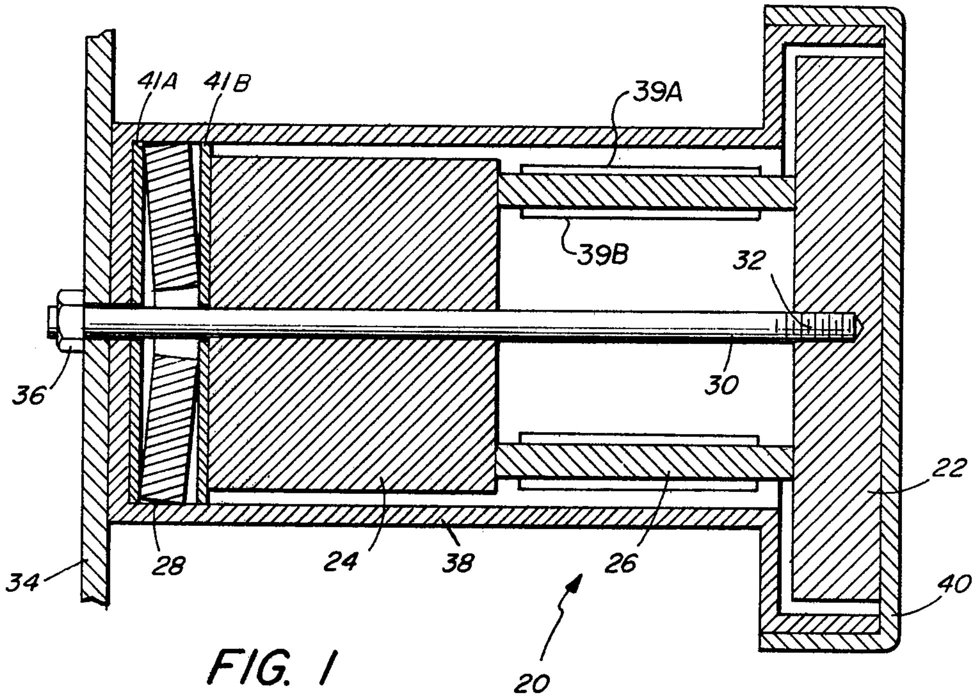
FIG. 1 is a sectional view of a transducer assembly according to the invention taken along the axis of the assembly.

Referring now to FIG. 1, there is seen a transducer assembly 20 which comprises, in accordance with the invention, a front mass 22, a rear mass 24, a transducer element 26 which is mechanically coupled between the front mass 22 and the rear mass 24, a spring 28, and a tie rod 30 positioned along the common axis of the spring 28, the rear mass 24, the transducer element 26 and the front mass 22. The tie rod 30 is threadedly secured to the front mass 22 by screw threads 32, and passes through a base 34 which may be a ship's hull or bulkhead to be secured thereto by a nut 36 threaded to the tie rod 30. The transducer assembly 20 is enclosed by a case 38 along its sides and at the rear, and by a rubber boot 40 at the front face of the transducer assembly 20. The transducer element 26 is composed of, preferably, a piezoelectric material such as lead zirconate titanate and is energized in a well-known manner by means of electrical conductors 39A and 39B secured, by way of example, to the inner and the outer cylindrical surfaces of the transducer element 26 as disclosed in the U.S. Pat. No. 3,284,761 which issued to G. R. Douglas on Nov. 8, 1966. In response to the application of electrical signals by these wires to the transducer element 26, the transducer element 26 undergoes contraction and expansion along its axis and thereby causes the front mass 22 to vibrate relative to the rear mass 24, these vibrations being communicated via the boot 40 to an external environment which is typically seawater.

The tie rod 30 urges the front mass 22 against the transducer element 26, this in turn being urged against the rear mass 24 and the spring 28 which pushes against the base 54. Discs 41A and 41B are placed contiguous to the spring 28 to prevent the relatively hard metal of the spring 28 from abrading the softer metal of the rear mass 24 and the case 38. The compliance of the tie rod 30 and the compliance of the spring 28 are selected in accordance with the magnitudes of the front mass 22, the rear mass 24 and the radiation mass presented by the seawater environment in a novel manner wherein the ratio of the tie rod compliance to the spring compliance is equal to the ratio of the magnitudes of the rear mass 24 to the sum of the front mass 22 and the radiation mass. Since the front mass 22 is substantially larger than the radiation mass, the frequency or resonance of the rear mass 24 with the compliance of the spring 28 approximately equals the frequency of resonance of the front mass 22 with the compliance of the tie rod 30. As a result of this relationship between the magnitudes of the compliances and the magnitudes of the masses, an acceleration of the transducer assembly along its axis, such as would be induced by a vibration of the base 34, results in equal displacements of the rear mass 24, the transducer element 26 and the front mass 22 such that there is no resultant compression or extension of the transducer element 26 by the front mass 22 and the rear mass 24. In this regard, it is noted that, upon an acceleration along the longitudinal axis of the transducer assembly 20, the force exerted by the spring 28 minus the reaction force of the accelerating rear mass 24 is balanced against the reaction force of the front mass 22 minus the reduction in tensile force of the tie rod 30 to negate any distension of the transducer element 26 which would otherwise result from the acceleration.

In this respect the structure of the present transducer differs from that shown in the aforementioned U.S. Pat. No. 3,284,761 which issued to G. R. Douglas on Nov. 8, 1966 wherein a tie rod is affixed to a base member by nuts on both sides of the base member with a resilient member to filter out the vibration of the supporting base. With such a structure, the aforementioned acceleration would result in the tie rod pushing the front mass in a forward direction providing a significantly different and unbalanced mode of vibration than the structure of the present invention wherein the front mass 22 is pushed forward by an amount equal to the displacement of the transducer element 26.

Figure 2:
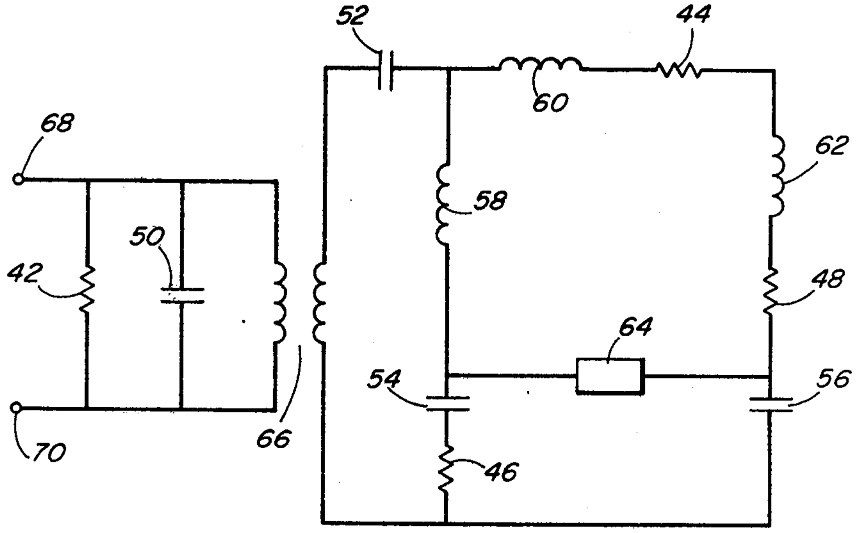
FIG. 2 is a schematic drawing of the electrical equivalent circuit of the transducer assembly of FIG. 1.

Referring now to FIG. 2, there is shown a schematic diagram of the equivalent circuit of the transducer assembly 20 of FIG. 1. The circuit comprises resistors 42, 44, 46 and 48 which represent respectively the ceramic dielectric loss of the transducer element 26, the mechanical loss resistance associated with the front mass 22 and other elements of the transducer assembly 20, the spring damping material and the radiation resistance; capacitors 50, 52, 54 and 56 which represent, respectively, the ceramic clamped capacitance of the transducer unit 26, the ceramic compliance of the transducer element 26, the compliance of the spring 28 and the compliance of the tie rod 30; inductors 58, 60 and 62 which represent, respectively, the mass of the rear mass 24, the mass of the front mass 22 and the radiation mass; an impedance element 64 representing the case 38 and a transformer 66 having a turns ratio of 1:N for coupling the circuit representing the mechanical elements to the terminals 68 and 70. The terminals 68 and 70 represent the electrical connection to the conductors 39A and 39B of the transducer element 26. The aforementioned relationship between the compliances and the masses is thus seen to be a relationship between the capacitors and inductors on the right hand side of the transformer 66. Similarly, each of the aforementioned resonant frequencies is seen to be given in terms of the well-known product of inductance times capacitance, where the inductors and capacitors are the elements of the circuit representing the mechanical elements of the transducer assembly 20. The frequency of resonance of the compliance of the spring 28 with the rear mass 24 differs from the frequency of resonance of the compliance of the tie rod 30 with the front mass 22 by an amount which may be as high as 20% and even 30% due to the effect of the resistance elements in the circuit of FIG. 2 for balancing out the effect of acceleration on the transducer element 26, in both amplitude and phase.

Figure 3:
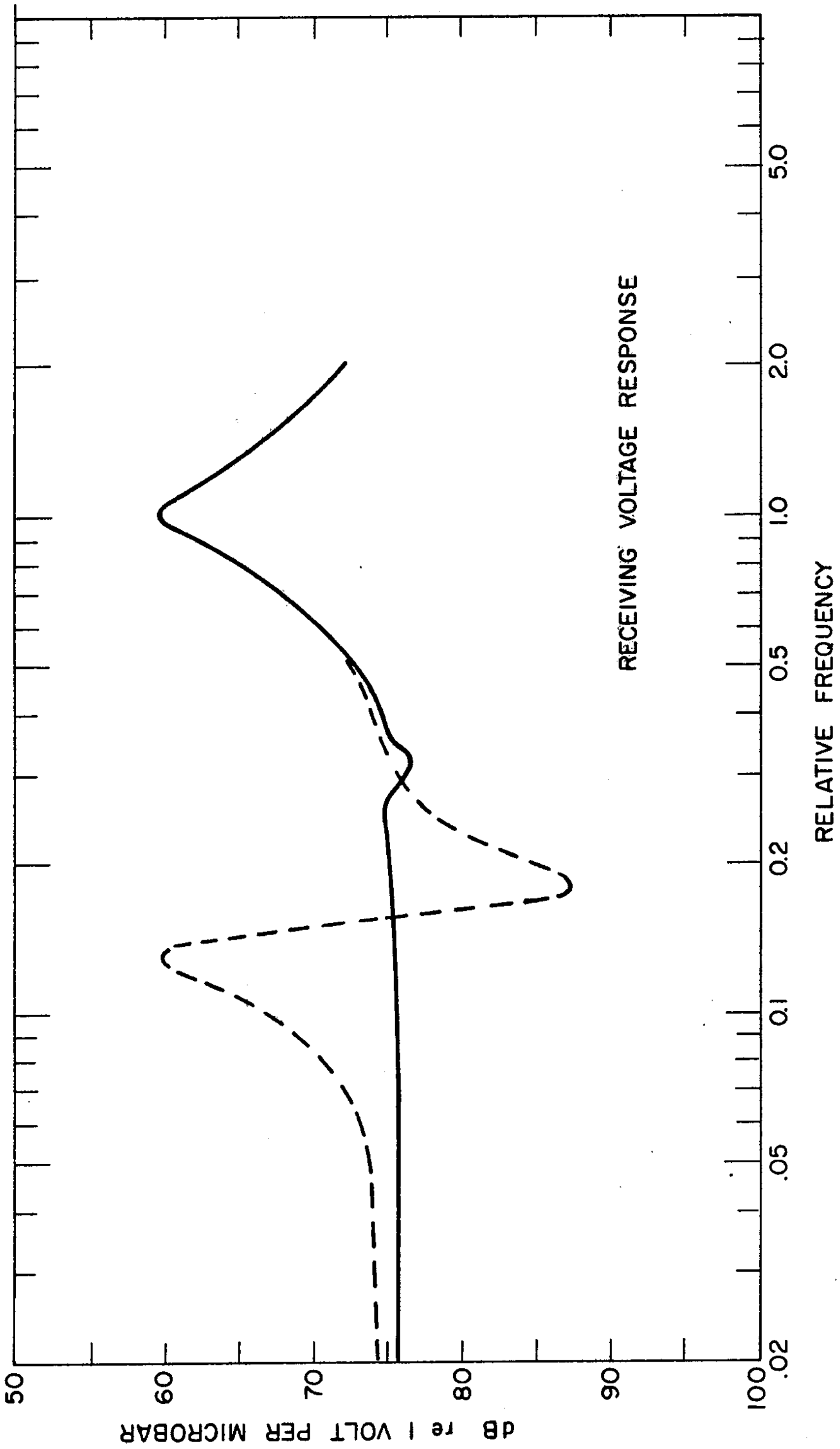
FIG. 3 is a graph of the balanced frequency response of the transducer assembly of FIG. 1 with the unbalanced response shown with a dotted line.

Referring now to FIG. 3, there is shown a graph in the form of a solid line which represents the response of the trans-ducer assembly 20 to an acoustic signal of varying frequency and incident upon the front face of the transducer assembly 20 while the transducer assembly 20 is immersed in water. Also shown is a graph drawn as a dotted line which represents the response of the conventional design in which the nut 36 is made to bear directly on the rear mass 24, instead of on the base 34 as shown in FIG. 1. The low frequency resonance/antiresonance, known as a housing resonance, is due to resonance of the rear mass 24 with the spring 28 in the absence of balancing forces provided by the structure of FIG. 1.

Figure 4:
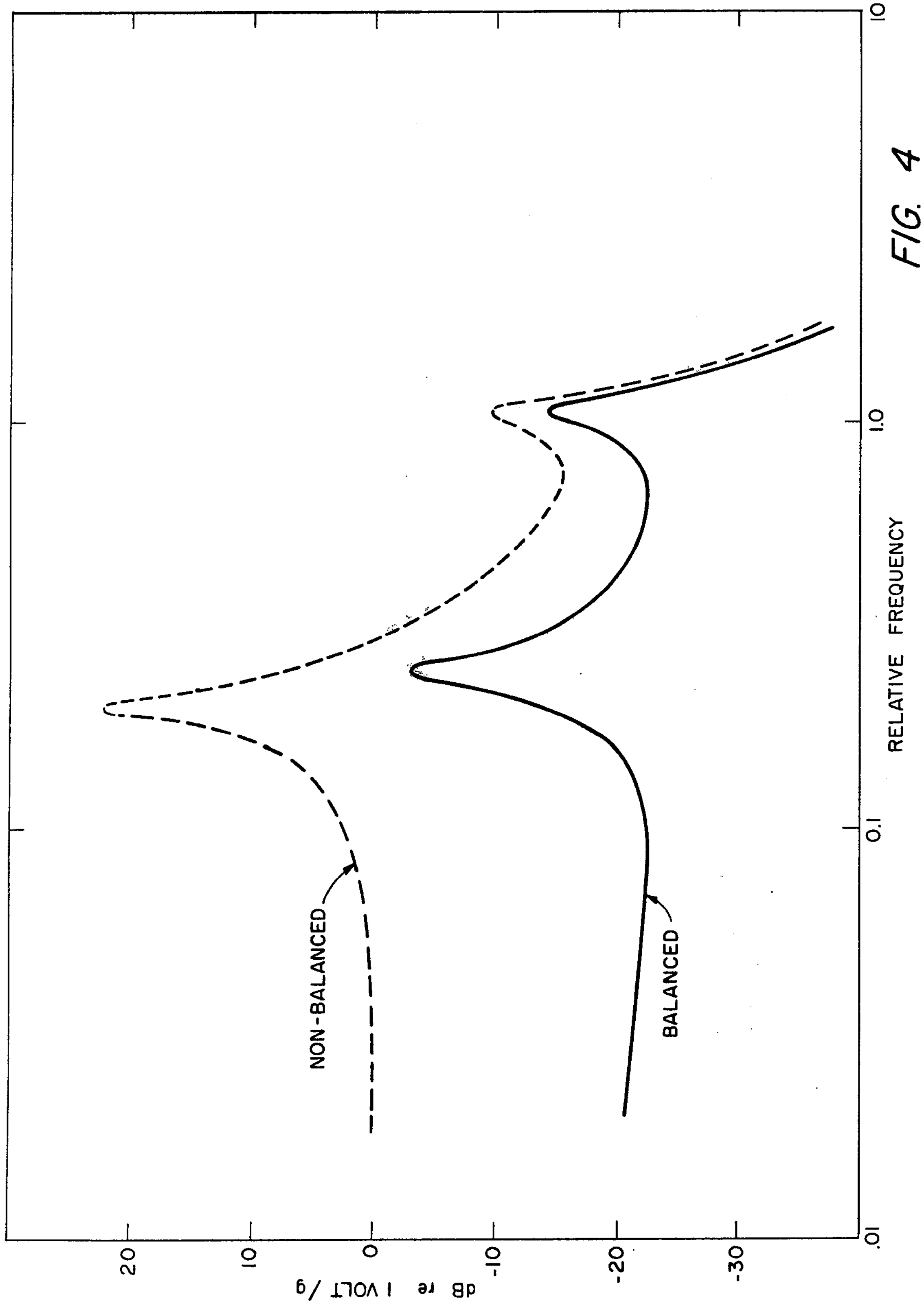
FIG. 4 is a graph, shown by a solid line, of the vibration response of the transducer assembly of FIG. 1 in response to a vibration of a base support for the assembly, a dotted line graph representing the response of a conventional transducer assembly being shown for comparison.

Referring now to FIG. 4, there is shown a graph in the form of a solid line which represents the vibration response of the transducer assembly 20 to a vibration of the base 34, the vibration response being an interference voltage appearing at the terminals of the transducer element 26 and generated therein in response to the vibration of the base 34. The vibration response is plotted in dicibels per g (acceleration of a free falling body) of acceleration versus relative frequency. Also shown is a graph in the form of a dashed line which represents the vibration response of a similar transducer if the nut 36 were made to bear directly on the mass 24, as is done in conventional transducer assemblies, instead of bearing on the base 34 as was shown in FIG. 1. From the graphs of FIGS. 3 and 4, it is seen that a substantial reduction in vibration induced interference is obtained by the described invention. Furthermore, the present invention provides a wide frequency band over which the receiving response of the transducer assembly 20 is substantially flat and free from the effects of unbalanced forces.

It is understood that the above-described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. A transducer assembly comprising:
   - a transducer element;
   - a first mass element and a second mass element positioned contiguous to and at opposite ends of said transducer element;
   - a compliant spring positioned between said second mass element and a first side of a base, said base having an aperture therein; and
   - a compliant tie rod means urging said first mass element, said transducer element and said second mass element towards one side of said compliant spring, said compliant tie rod means passing freely through said aperture in said base and contacting said base on a side thereof opposite said first side thereof for urging said base toward a side of said compliant spring opposite said one side thereof to counteract a force exerted by said second mass element against said compliance spring, the compliance of said spring being of a value to resonate with said second mass element at a frequency approximately equal to the frequency of a resonance of said first mass element with the compliance of said tie rod means.

2. A transducer assembly according to claim 1 wherein sai first mass element and said second mass element and said transducer element have cylindrical symmetry about a common axis.

3. A transducer assembly according to claim 2 wherein said tie rod means and said spring each have an axis parallel to the axis of said transducer element.

4. A transducer assembly having a tie rod means for mounting said assembly on a base which has a first side thereof and a second side opposed thereto and an aperture passing through said base from said first side to said second side, said transducer assembly comprising:
   - a transducer element having a tubular form and having a first and a second end thereof;

a spring having an aperture therein and mounted coaxially to an axis passing through said base and said transducer element, said second side of said base facing said spring;

a rear mass element having an aperture therein and positioned coaxially to said transducer element and between said second end of said transducer element and said spring;

said tie rod means being positioned within said transducer element and extending beyond said first end thereof, said tie rod means extending through said aperture of said rear mass element, through said aperture of said spring and through said aperture of said base;

first and second means connected respectively to first and second ends of said tie rod means for urging said base and said transducer element toward each other, said first urging means contacting said first end of said transducer element, and said second urging means contacting said first side of said base; and wherein said first urging means has a first mass, the ratio of the magnitude of said rear mass to the magnitude of said first mass being approximately equal to the ratio of a compliance of said tie rod means to a compliance of said spring to decouple vibrations of said base from vibrations of said transducer element.

* * * * *

UNITED STATES PATENT OFFICE
CERTIFICATE OF CORRECTION

Patent No. 4,129,850 Dated Dec. 12, 1978

Inventor(s) James E. Mumper

It is certified that error appears in the above-identified patent and that said Letters Patent are hereby corrected as shown below:

Column 2, line 44: change "54" to - 34 - ;

Column 4, line 11: change "dicibels" to - decibels - ;

Column 4, line 56: change "sai" to - said - .

Signed and Sealed this

*Twenty-fourth* Day of *April 1979*

[SEAL]

*Attest:*

RUTH C. MASON
*Attesting Officer*

DONALD W. BANNER
*Commissioner of Patents and Trademarks*